US009938027B2

(12) United States Patent
Hickman (10) Patent No.: US 9,938,027 B2
(45) Date of Patent: *Apr. 10, 2018

(54) METHODS OF ACCELERATING A TARGET VEHICLE TO A HIGHER ORBIT VIA A KINETIC ENERGY STORAGE AND TRANSFER (KEST) SPACE VEHICLE

(71) Applicant: The Aerospace Corporation, El Segundo, CA (US)

(72) Inventor: Robert Alan Hickman, Palos Verdes Estates, CA (US)

(73) Assignee: The Aerospace Corporation, El Segundo, CA (US)

(*) Notice: Subject to any disclaimer, the term of this patent is extended or adjusted under 35 U.S.C. 154(b) by 39 days.

This patent is subject to a terminal disclaimer.

(21) Appl. No.: 14/963,830

(22) Filed: Dec. 9, 2015

(65) Prior Publication Data

US 2016/0090197 A1    Mar. 31, 2016

Related U.S. Application Data

(63) Continuation of application No. 13/963,025, filed on Aug. 9, 2013, now Pat. No. 9,260,204.

(51) Int. Cl.
*B64G 1/64* (2006.01)
*B64G 1/00* (2006.01)
*B64G 1/24* (2006.01)
*B64G 1/40* (2006.01)
*B64G 1/36* (2006.01)

(52) U.S. Cl.
CPC ............ *B64G 1/648* (2013.01); *B64G 1/002* (2013.01); *B64G 1/005* (2013.01); *B64G 1/007* (2013.01); *B64G 1/242* (2013.01); *B64G 1/40* (2013.01); *B64G 1/405* (2013.01); *B64G 1/646* (2013.01); *B64G 1/36* (2013.01); *B64G 1/402* (2013.01)

(58) Field of Classification Search
CPC ...... B64G 1/648; B64G 1/1078; B64G 1/646; B64G 1/64; B64G 1/007; B64G 1/002; B64G 1/005; B64G 1/242; F41H 11/02
See application file for complete search history.

(56) References Cited

U.S. PATENT DOCUMENTS 2,193,312 A    3/1940   Cobham et al.
3,478,986 A    11/1969  Fogarty
(Continued)

FOREIGN PATENT DOCUMENTS

EP    2671805 A1 *  12/2013   ........... B64G 1/1078

OTHER PUBLICATIONS

USPTO, "Non-Final Office Action" dated Jun. 24, 2016 for U.S. Appl. No. 14/973,793.
(Continued)

*Primary Examiner* — Tien Q Dinh
*Assistant Examiner* — Alexander V. Giczy
(74) *Attorney, Agent, or Firm* — LeonardPatel PC (57) ABSTRACT

Methods of accelerating a target vehicle to a higher orbit via a Kinetic Energy Storage and Transfer (KEST) vehicle are provided. The KEST vehicle is configured to transfer kinetic energy to the target vehicle by way of a catching mechanism using one or more brakes on one or more associated tethers along which the braking mechanism traverses, accelerating the target vehicle into a higher orbit, potentially even beyond the Earth.

14 Claims, 8 Drawing Sheets

(56) References Cited

U.S. PATENT DOCUMENTS

| | | | |
|---|---|---|---|
| 4,712,753 A | | 12/1987 | Howard |
| 5,082,211 A | * | 1/1992 | Werka .................. B64G 1/242 244/158.2 |
| 5,163,641 A | | 11/1992 | Yasaka |
| 5,279,482 A | | 1/1994 | Dzenitis et al. |
| 5,806,232 A | | 9/1998 | James |
| 6,116,544 A | | 9/2000 | Forward et al. |
| 6,866,232 B1 | | 3/2005 | Finney |
| 6,945,499 B1 | | 9/2005 | Robinson |
| 7,854,087 B1 | | 12/2010 | Pervez |
| 9,260,204 B2 | | 2/2016 | Hickman |
| 2005/0067524 A1 | * | 3/2005 | Johansen ............... B64D 3/00 244/3 |
| 2005/0103939 A1 | | 5/2005 | Bischof et al. |
| 2005/0103940 A1 | | 5/2005 | Bischof et al. |
| 2006/0145024 A1 | * | 7/2006 | Kosmas ............... B64G 1/1078 244/172.5 |
| 2008/0099624 A1 | | 5/2008 | Evjenth |
| 2010/0051750 A1 | | 3/2010 | Dempsey |
| 2010/0072321 A1 | | 3/2010 | Lenard |
| 2010/0193640 A1 | | 8/2010 | Atmur et al. |
| 2010/0237183 A1 | | 9/2010 | Wilson et al. |
| 2011/0036952 A1 | | 2/2011 | Moorer et al. |
| 2011/0153210 A1 | * | 6/2011 | Stimac ................... B64G 1/646 701/300 |
| 2011/0153211 A1 | | 6/2011 | Stimac et al. |
| 2011/0192936 A1 | | 8/2011 | Knirsch |
| 2011/0272528 A1 | | 11/2011 | Maiboroda |
| 2012/0117938 A1 | | 5/2012 | Barral et al. |
| 2012/0210904 A1 | | 8/2012 | Merems |
| 2012/0292449 A1 | | 11/2012 | Levin et al. |
| 2013/0140403 A1 | | 6/2013 | Goff et al. |
| 2013/0175401 A1 | * | 7/2013 | Starke ................. B64G 1/1078 244/171.1 |

OTHER PUBLICATIONS

Paul Lucas, "Cosmic Rope Tricks: Space Tethers and Rotovators", article issued on Apr. 14, 2003.

Robert P. Hoyt, "Design and Simulation of a Tether Boost Facility for Leo—GTO Transport", issued in Tethers Unlimited, Inc., Seattle, Washington.

Robert P. Hoyt, "Responsive Launch of Small Spacecraft Using Reusable In-Space Tether and Air-Launch Technologies", issued in Tethers Unlimited, Inc., Bothell, WA.

Robert P. Hoyt, "Stabilization of Electrodynamic Space Tethers", issued in Tethers Unlimited, Inc.

Wikipedia Page, "Inelastic collision" achieved by Internet archive on Jun. 20, 2016, https://en.wikipedia.org/wiki/Inelastic collision.

USPTO, "Final Office Action", dated Sep. 21, 2016 for U.S. Appl. No. 14/973,793.

Wikipedia, "Inelastic collision", https://en.wikipedia.org/wiki/Inelastic_collision, accessed on Sep. 7, 2016.

USPTO, "Non-Final Office Action", dated Mar. 6, 2017 for U.S. Appl. No. 14/973,793 with Tethers Unlimited art.

"The Rocket/Skyhook Combination," by F. Burke Carley and Hans P. Moravec, L5 News, Mar. 1983, http://www.nss.org/settlement/L5news/1983-skyhook.htm (last accessed Aug. 6, 2013).

Bisbos.com, Profac, https://www.bisbos.com/space_n_profac.html, accessed Aug. 18, 2015; archived by Internet Archive on Jan. 24, 2012, https://web.archive.org/web/20120124234915/http://www.bisbos.com/space_n_profac.html.

David P. Stem and Dr. Mauricio Peredo, "The Space Tether Experiment", http://www-spof.gsfc.nasa.gov/Education/wtether.html, last updated Nov. 25, 2001; accessed Aug. 19, 2015.

E. Sarmont, "How an Earth Orbiting Tether Makes Possible an Affordable Earth-Moon Space Transportation System," SAE Technical Paper 942120 (1994).

G. Tyc et al., "Flight dynamics results from the OEDIPUS-C tether mission", A|AA/AAS Astrodunamics Conference, San Diego CA Jul. 29-31, 1996. Collection of Technical Papers (A96-34712 09-12), 1996, pp. 39-50. A|AA Paper 96-3573.

Notice of Allowance issued in U.S. Appl. No. 13/963,025 dated Oct. 13, 2015.

USPTO, "Non-Final Office Action" dated Jul. 17, 2015 for U.S. Appl. No. 13/963,025.

The Alna Space Program, Atmospheric Harvesting, http://www.alnaspaceprogram.org/blog/?p=25, posted Sep. 28, 2011, accessed Aug. 18, 2015.

The Alna Space Program, Tethers as momentum exchange devices (Studies on Tethers), http://alnaspaceprogram.org/cable.html, 2011-2012; accessed Aug. 18, 2015; archived by Internet Archive on Jan. 4, 2013, https://web.archive.org/web/20130104171354/http://alnaspaceprogram.org/cable.html.

Wikipedia page "Fishing Line", archieved by Internet Archive on Jan. 17, 2010. https://web.archive.org/web/20100117170251/http://en.wikipedia.org/wiki/Fishing_line, accessed on Jul. 12, 2015.

USPTO, "Final Office Action" dated Sep. 1, 2015 for U.S. Appl. No. 13/963,025.

* cited by examiner

FIG. 1

RELATED ART

METHODS OF ACCELERATING A TARGET VEHICLE TO A HIGHER ORBIT VIA A KINETIC ENERGY STORAGE AND TRANSFER (KEST) SPACE VEHICLE

CROSS REFERENCE TO RELATED APPLICATION

This application is a continuation of, and claims priority to, U.S. patent application Ser. No. 13/963,025 filed Aug. 9, 2013. The subject matter of this earlier filed application is hereby incorporated by reference in its entirety.

FIELD

The present invention generally pertains to space vehicles, and more specifically, to a Kinetic Energy Storage and Transfer (KEST) vehicle that is configured to transfer kinetic energy to a target vehicle.

BACKGROUND

Figure 1:
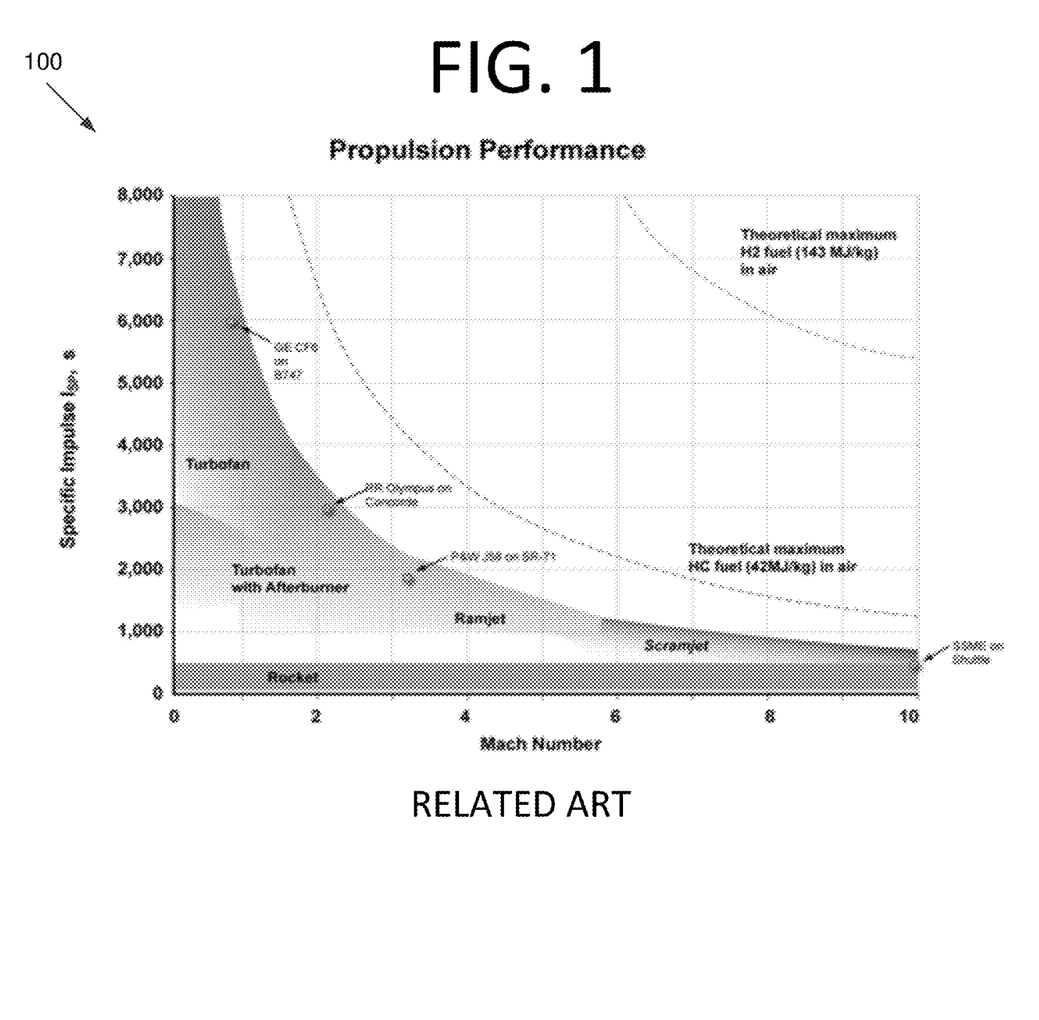
FIG. 1 is a graph illustrating specific impulse for various propulsion modes.

The amount of expendable hardware required to place a satellite in orbit is the primary cost driver for access to space. Specific impulse ($I_{sp}$) is one of the major factors determining the size of the vehicle required to accelerate a spacecraft to orbital velocity. As shown in graph 100 of FIG. 1, the specific impulse of rocket propulsion is limited to approximately 450 seconds. Air breathing hypersonic propulsion such as scramjets have much higher specific impulses and have been proposed for space transportation, but they have proven to be impractical due to their limited thrust potential.

Because scramjet propulsion has low thrust and must operate within the atmosphere, gravity and drag losses are high. Under these conditions, rocket propulsion is more efficient. Electrical propulsion has even higher $I_{sp}$ (3,000 seconds or more), but has even lower thrust. As a result, electric propulsion cannot be directly employed as an ascent propulsion system. However, the ability to take advantage of the high $I_{sp}$ of electric propulsion systems in order to propel vehicles into orbit or beyond may be beneficial.

SUMMARY

Certain embodiments of the present invention may be implemented and provide solutions to the problems and needs in the art that have not yet been fully solved by conventional launch systems. For example, certain embodiments of the present invention take advantage of the high $I_{sp}$ of electrical propulsion and make it available for launch ascent propulsion or transfer from low Earth orbit to higher energy orbits, such as a geo-stationary transfer orbit or an escape orbit. Such embodiments may accomplish this by using electrical propulsion to accelerate an orbital KEST vehicle to higher energy elliptical orbits or even trajectories beyond the Earth. The perigee of the KEST vehicle may intersect the trajectory of a spacecraft launched into a high altitude sub-orbital trajectory or low Earth orbit.

As the vehicles come into contact with one another via a catch system, forces are generated that accelerate the target vehicle and slow the KEST vehicle. In some embodiments, the target vehicle may have its own attitude control and guidance systems to modify its trajectory and ensure that the proper intersect point is achieved. The catching mechanism can reside on the KEST vehicle, the target vehicle, or be split between the two. For example, if the catching mechanism is composed of steel or woven synthetic fiber such as Kev-lar™, energy absorbing (i.e., cushioning) material could be provided on the target vehicle to help mitigate the shock at contact.

If the KEST vehicle has sufficient momentum, both vehicles will be orbital at the completion of their engagement. To control the magnitude of the forces and acceleration imparted to the vehicles, a catching mechanism on the KEST vehicle may be allowed to slide on one or more long tethers extending from the KEST vehicle. The friction between the catching mechanism and the tethers controls the rate of transfer of momentum between the vehicles. The KEST vehicle may use its electrical propulsion system to return to the higher energy orbit and prepare for the next intercept once the target vehicle is accelerated and released. Such embodiments may significantly reduce the amount of expendable hardware and the cost of reaching low Earth orbit or higher energy orbits.

In one embodiment of the present invention, an apparatus includes an electric propulsion system and at least one tether extending from the apparatus. The apparatus also includes a catching mechanism configured to travel along the at least one tether.

In another embodiment of the present invention, a method includes launching, via a first launch vehicle, a KEST vehicle into a highly elliptical orbit. The method also includes launching, via a second launch vehicle, a target vehicle on a sub-orbital trajectory selected to encounter the KEST vehicle. The method further includes catching, by the KEST vehicle, the target vehicle via a catching mechanism. Additionally, the method includes accelerating, via the catching mechanism, the target vehicle to a higher energy orbit.

In yet another embodiment of the present invention, a system includes a KEST vehicle configured to accelerate another space vehicle and a target vehicle configured to encounter, and be accelerated by, the KEST vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a KEST vehicle that is configured to transfer kinetic energy to a target vehicle, propelling the target vehicle into a higher orbit or beyond Earth. Such embodiments use a relatively high $I_{sp}$ of electric propulsion in order to provide additional kinetic energy to the KEST vehicle after it is launched from Earth. This KEST launch vehicle may reach speeds in excess of 30,000 feet per second. In some embodiments, the target vehicle, such as a satellite or other spacecraft, is launched to a high altitude suborbital trajectory (e.g., 300 nautical miles). The trajectory of the spacecraft may be selected to intercept the orbit of the KEST vehicle at perigee. However, while perigee is the optimal point, other trajectory points may be selected.

The slower moving target vehicle comes into contact with a catching mechanism of the KEST vehicle. In some embodiments, the catching mechanism is configured to slow to a velocity lower than the remainder of the KEST vehicle, or even to match the velocity of the target vehicle. The catching mechanism may include its own thrusters or mechanical motor or electromagnetic motor to move the catching mechanism along the tether. This may also serve to restore the catching mechanism to its original position after intercepting, accelerating, and releasing the target vehicle.

Once the target vehicle contacts the catching mechanism, forces are generated that slow the KEST vehicle and accelerate the target vehicle. If the transfer of energy was instantaneous, such as if the vehicles simply collided or the catching mechanism was rigidly fixed to the KEST vehicle, both vehicles would be annihilated due to the exceptional forces. This is because the difference in speed between the KEST vehicle and target vehicle may be 6,000-15,000 ft/sec or more. To prevent this, the catching mechanism slides on one or more long tethers extending from the KEST vehicle. Single tether embodiments may be preferable since the tether can generally be longer. Furthermore, generally speaking, the longer the tether, the larger the target vehicles that can be accommodated. For multiple tethers, weight may become an issue. The magnitude of the accelerating force is controlled by the length of the one or more tethers and the frictional force between the tether and one or more brakes of the catching mechanism. The one or more brakes may be configured to adjust the amount of force that is generated.

Figure 2A:
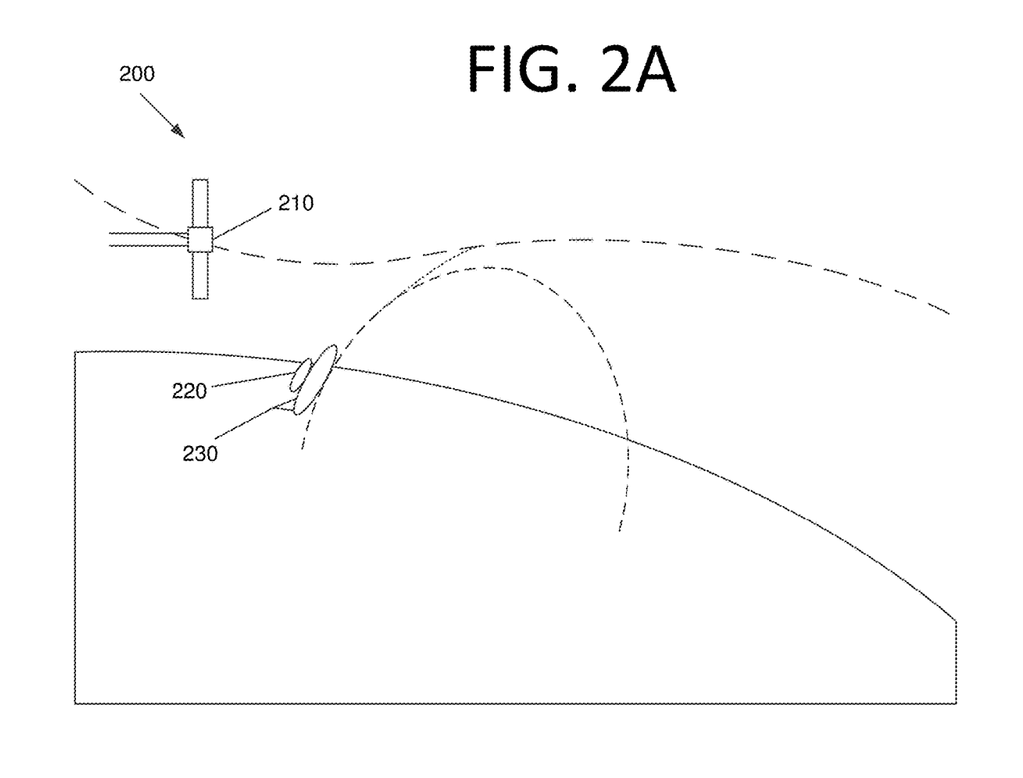
FIGS. 2A-C illustrate KEST and target vehicle interaction before, during, and after intercept, according to an embodiment of the present invention.
Figure 2B:
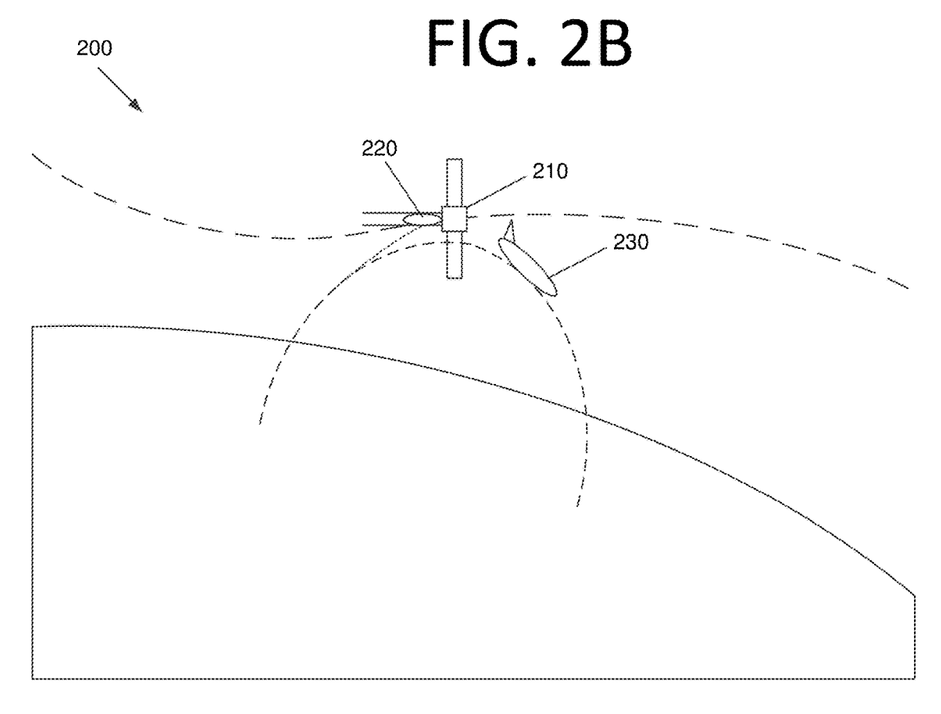
Figure 2C:
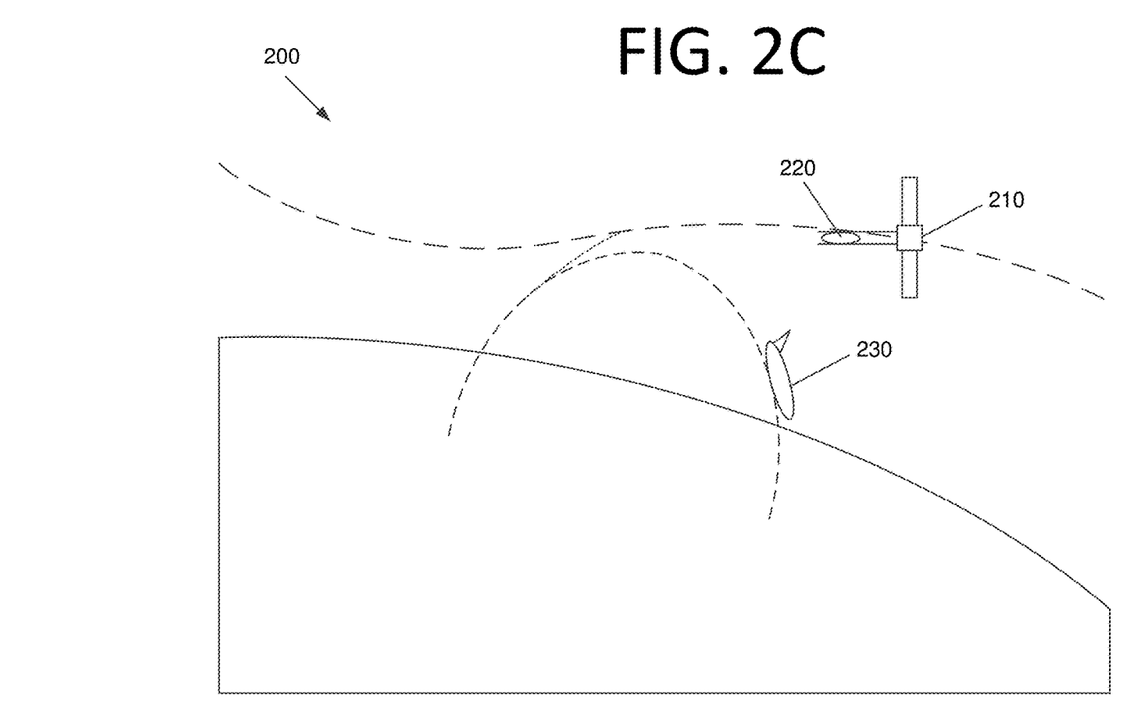

Illustrations of KEST and target vehicle interaction 200 before, during, and after intercept are provided in FIGS. 2A-C, respectively. A KEST vehicle 210 is first placed into orbit. This occurs ahead of the deployment of a target vehicle 220 by a launch vehicle 230. KEST vehicle 210 uses electric propulsion to accelerate to higher energy elliptical orbits. Target vehicle 220 is subsequently launched by launch vehicle 230 into a high altitude suborbital trajectory (e.g., 300 nautical miles) with a desired velocity, such as 15,000 ft/sec. The timing of the launch is carefully planned so that the orbit of KEST vehicle 210 will intersect the suborbital trajectory of target vehicle 220 at perigee for KEST vehicle 210. KEST vehicle 210 may use radar, laser range finding systems, and/or its attitude control system to precisely control rendezvous of both vehicles so that target vehicle 220 engages with a catching mechanism on KEST vehicle 210. In some embodiments, target vehicle 220 may also assist with positioning using its own systems and thrusters.

As target vehicle 220 contacts the catching mechanism, the force between the vehicles rapidly increases, slowing KEST vehicle 210 and accelerating target vehicle 220. If this acceleration period is too small, the forces will be too high, damaging or destroying both vehicles. To moderate the forces, the catching mechanism is allowed to slide on long tethers extending from KEST vehicle 210. The friction between one or more brakes of the catching mechanism, when applied to the tethers, determines the magnitude of force between the vehicles.

The frictional force should be sufficient so that by the time target vehicle 220 reaches the end of the tethers, target vehicle 220 has reached the desired orbital velocity or a velocity sufficient to leave Earth orbit. If KEST vehicle 210 is traveling at 30,000 ft/sec, launch vehicle 230 accelerates target vehicle 220 to 15,000 ft/sec, and the tethers are 15,000 feet long, then the acceleration force on target vehicle 220 should be at least 100 g's. The required g-forces are inversely proportional to the tether length.

A small target vehicle could be designed for 100 g's, but this may be impractical for larger payloads. Accordingly, longer tethers may be required for such payloads in order to reduce the g-forces that are generated. Any desired tether length may be used based on the desired payload. For instance, for man-rated systems, the tethers would likely need to be quite long in order to achieve acceptably low g-forces. However, the longer the tether length, the more weight that is added to KEST vehicle 210.

KEST vehicle 210 should have sufficient momentum such that KEST vehicle 210 and target vehicle 220 will reach or maintain orbital velocity (~25,000 ft/sec) after the engagement. If KEST vehicle 210 weighs 10,000 lbs. and is traveling at 30,000 ft/sec, KEST vehicle 210 could accelerate a 5,000 lb. target vehicle to orbital velocity. In most embodiments, KEST vehicle 210 is larger than target vehicle 220 in order to more readily reach the desired momentum. A smaller KEST vehicle traveling at higher speeds may be used, although such embodiments are less likely to be commercially practicable. After releasing target vehicle 220, KEST vehicle 210 uses its electric propulsion system to accelerate back to the high energy orbit.

Potentially, KEST vehicle 210 could also transport target vehicle 220 to a higher energy orbit if needed. Periodically, KEST vehicle 210 may dock with a Xenon depot, for example, to refill the propellant tank. Depending on the size of target vehicle 220, KEST vehicle 210 may deploy several target vehicles before needing to refuel.

Because the rocket equation is a logarithmic function, a launch vehicle with only 20% of the impulse required to accelerate a target vehicle to orbital velocity may be used under the KEST scenario. This translates to a much lower cost to deploy the target vehicle.

FIGS. 2A-C show target vehicle 220 being deployed on a reusable booster (i.e., launch vehicle 230), but target vehicle 220 could also be launched into the suborbital trajectory by a conventional (expendable) launch vehicle. Under the scenario in which a reusable booster is used, no expendable hardware would be needed to deploy target vehicle 220, resulting in an even lower cost to access space.

Figure 3:
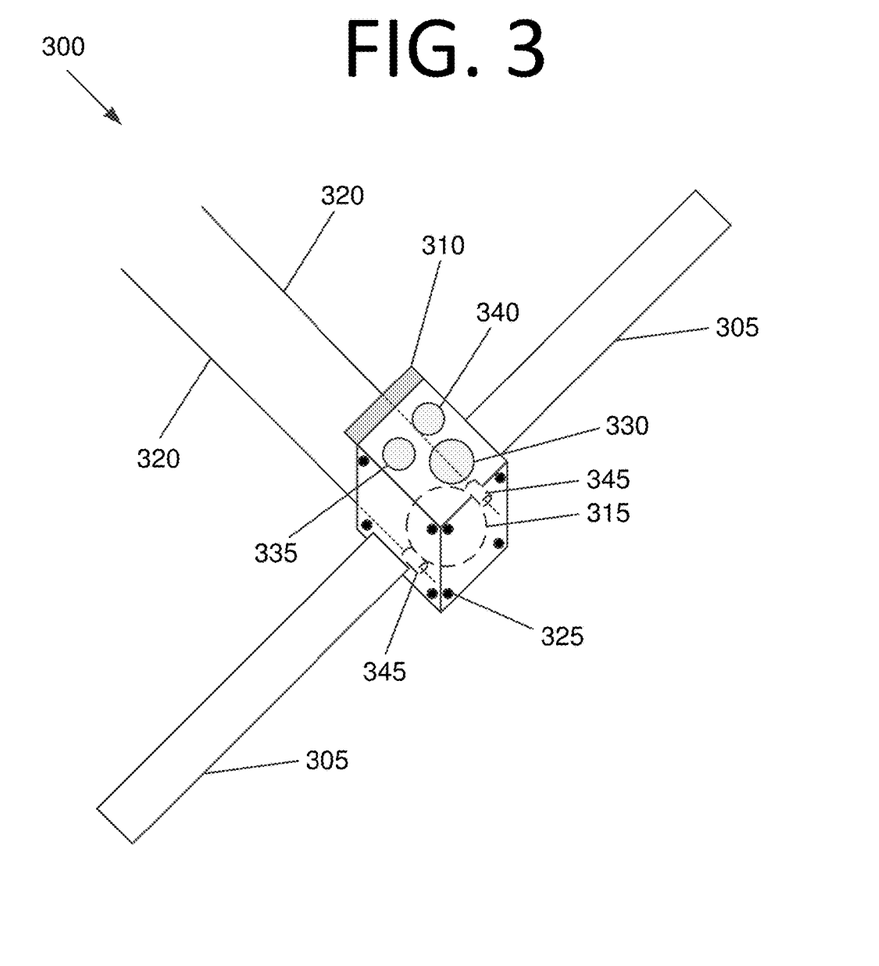
FIG. 3 illustrates a KEST vehicle, according to an embodiment of the present invention.

FIG. 3 illustrates a KEST vehicle 300, according to an embodiment of the present invention. As an orbital vehicle, KEST vehicle 300 may have all of the systems typically required for a satellite, including attitude control, thermal control, communications, etc. To perform the KEST mission, KEST vehicle 300 has a pair of solar arrays 305 to power electric propulsion system 310. Electric propulsion system 310 may use electrostatic ion or electromagnetic thrusters, but any suitable thruster mechanism or electric propulsion system may be used. Such a configuration may provide specific impulses ranging from 3,000 to 6,000 seconds, for example.

Catching mechanism 315 could be a grid of stainless steel cable, woven synthetic fiber such as Kevlar™ or Spectra™, carbon fiber, graphene, and/or any other suitable material forming a net. Catching mechanism 315 may be attached to KEST vehicle 300 by cable grips 345 including braking mechanisms that are configured to slide along tethers 320. Catching mechanism 315, cable grips 345, and appropriate portions of tethers 320 are illustrated using dashed lines in FIG. 3 to indicate that they are located under KEST vehicle 300 from this perspective. Cable grips 345 may be automatically adjusted in some embodiments to provide varying levels of sliding friction depending on the weight of the target vehicle to be engaged. Because mechanical brakes may experience wear and/or burn up due to the high friction required to accelerate the target vehicle, an electromagnetic or electromechanical braking system may be used in some embodiments. Tethers 320 may be composed of stainless steel, cable including a woven synthetic fiber such as Kevlar™ or Spectra™, or any other suitable material. Lighter materials may be preferable since they would reduce the overall weight of KEST vehicle 300, and thus lower the cost of launching KEST vehicle 300. To stop a 100 lb. target vehicle in 15,000 feet using two cables may require a cable strength of 21,000 lbs., or a Spectra™ cable diameter of 7/16 in.

Attitude control system (ACS) thrusters 325 are configured to maneuver KEST vehicle 300 to a desired orientation and trajectory. For example, ACS thrusters 325 may enable KEST vehicle 300 to make last minute maneuvers to precisely control intersection of the trajectories of KEST vehicle 300 and the target vehicle. Xenon tank 330, MonoMethylHydrazine (MMH) tank 335, and $N_2O_4$ tank 340 provide propellant for ACS thrusters 325. ACS thrusters 325 are included in this embodiment since electric propulsion generally lacks the thrust necessary for rapid response maneuvers.

Figure 4:
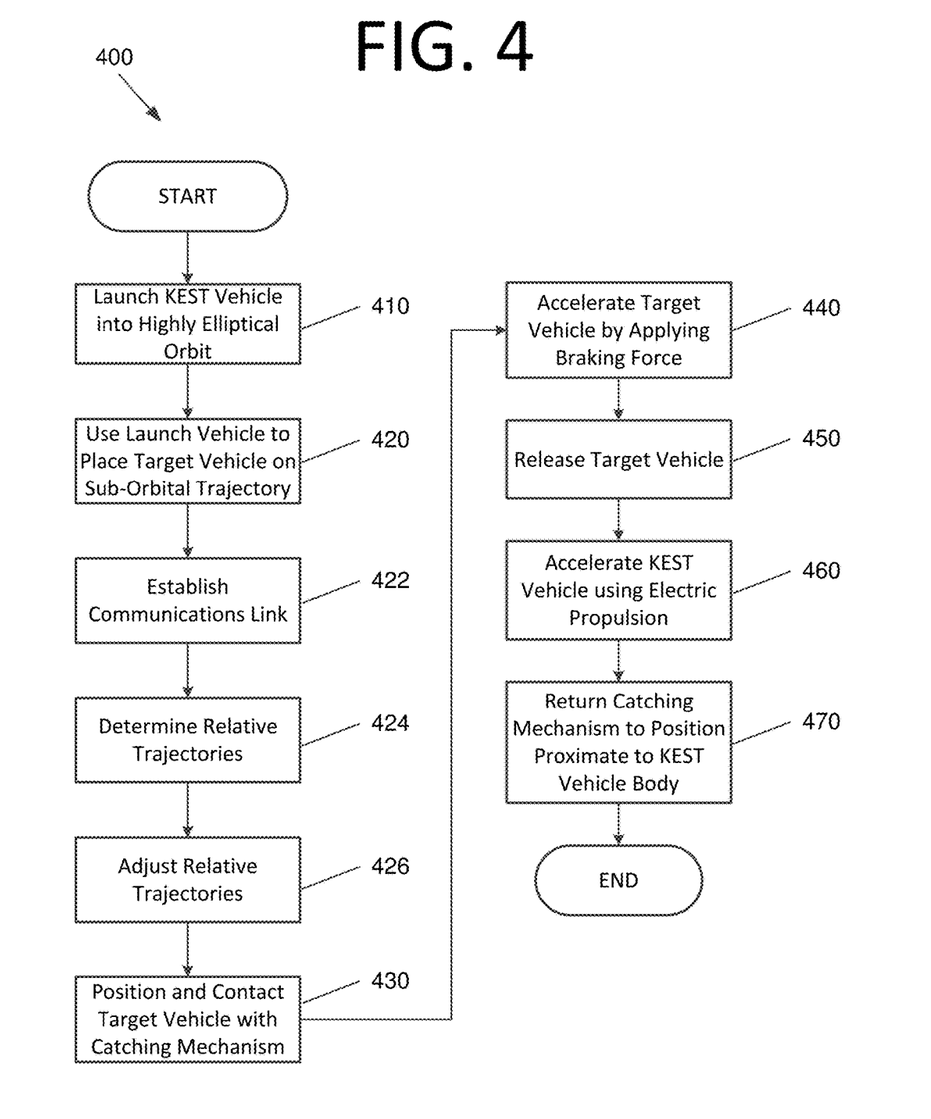
FIG. 4 is a flowchart illustrating a method for propelling a target vehicle into a higher orbit, according to an embodiment of the present invention.

FIG. 4 is a flowchart 400 illustrating a method for propelling a target vehicle into a higher energy orbit, according to an embodiment of the present invention. The method begins with launching a KEST vehicle into a highly elliptical orbit at 410 using a launch vehicle. The KEST vehicle may be launched into an orbital trajectory and may then use its electric propulsion system to reach a higher orbit in some embodiments.

A launch vehicle is used to place a target vehicle on a sub-orbital trajectory at 420. The sub-orbital trajectory should be selected such that the target vehicle encounters the KEST vehicle at or near the perigee of the KEST vehicle. In some embodiments, careful control is required to position the target vehicle within the correct capture zone relative to the KEST vehicle. Both the KEST vehicle and target vehicle may have active electronic controls that use GPS, radar, or other sensors to determine the relative position and trajectory of the vehicles, and a guidance system (with specialized processors and software) to adjust the trajectory using the attitude control system. If both the target vehicle and KEST vehicle use an active guidance control system, then a communication link between the vehicles may be established at 422 and used to coordinate their maneuvers. For instance, relative trajectories of the KEST vehicle and target vehicle may be determined at 424, and the trajectories of the target vehicle and/or the KEST vehicle may be adjusted at 426. The target vehicle then contacts a catching mechanism of the KEST vehicle at 430.

The catching mechanism accelerates the target vehicle at a suitable force (e.g., 5-100 g for unmanned applications) by applying a braking force at 440 using a braking mechanism of the catching mechanism as the catching mechanism and target vehicle travel along the length of the tether. Once the desired speed is achieved, the target vehicle is released from the catching mechanism at 450 and propelled into a higher energy orbit. This release may be performed by the catching mechanism, the target vehicle, or both. For example, the target vehicle may fire ACS thrusters to provide a force to separate the target vehicle from the catching mechanism.

The catching mechanism includes a drive motor and mechanism that allows it to transit along the tether(s) towards the KEST vehicle after the target vehicle is released. The KEST vehicle then uses its electric propulsion system to position itself in the desired orbit at 460, and the catching mechanism is returned to a position proximate to the body of the KEST vehicle at 470. If refueling of propellant(s) is needed, the KEST vehicle may refuel at an on-orbit depot. In other words, a separate spacecraft may be launched into orbit that stores propellant(s), and the KEST vehicle may dock with the refueling vehicle to refuel its propellant. The KEST vehicle may then be used again to place another target vehicle into a higher orbit.

Figure 5:
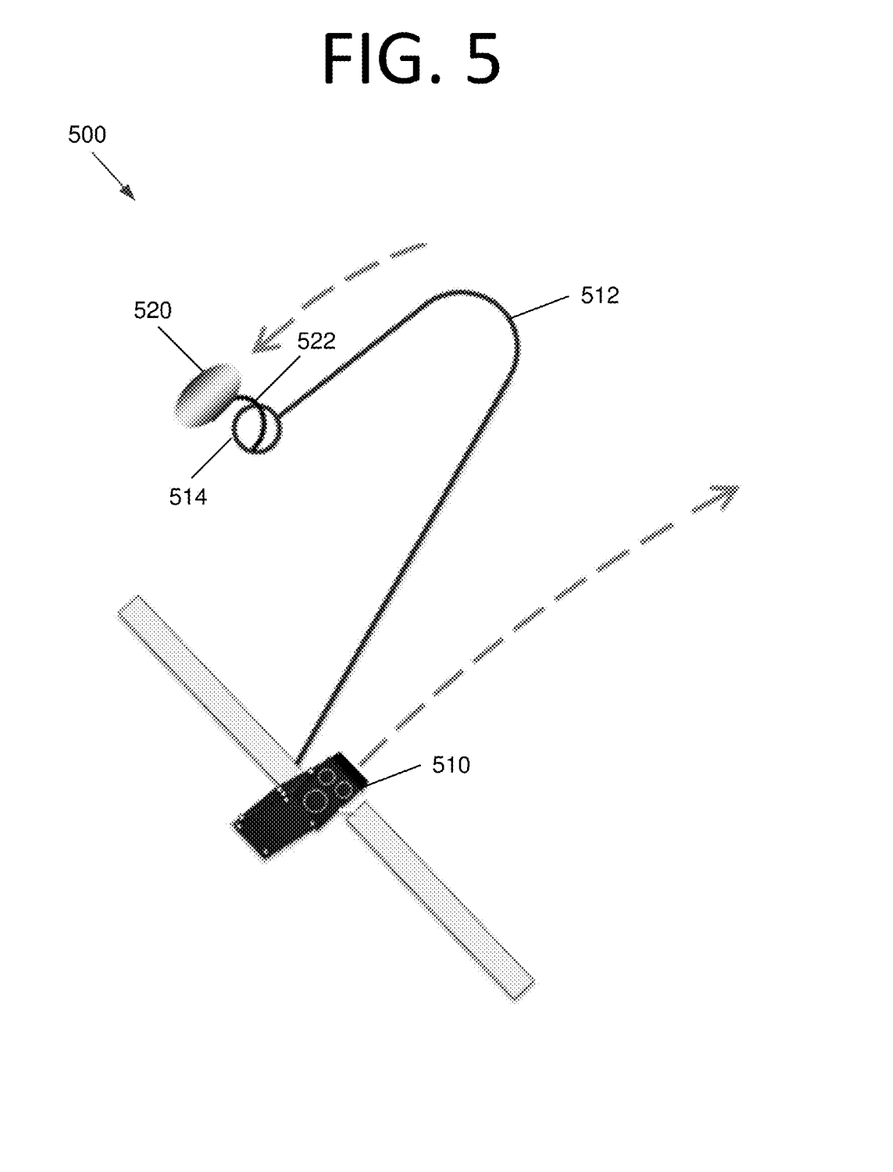
FIG. 5 illustrates an alternative KEST vehicle and target vehicle system, according to an embodiment of the present invention.

FIG. 5 illustrates an alternative KEST vehicle and target vehicle system 500, according to an embodiment of the present invention. Instead of trailing behind the KEST vehicle, as in FIGS. 2 and 3, a single tether 512 precedes in front of KEST vehicle 510. At the front end of the tether is a ring 514 or other suitable mechanism configured to engage target vehicle 520 as it flies by, in this case via a hook 522. As depicted by the gray dashed lines, KEST vehicle 510 and target vehicle 520 are traveling in roughly opposite directions.

The contact between hook 522 and ring 514 begins to apply a force that will slow the front end of tether 512. Tether 512 then folds over on itself with the front end (preceding the bend in tether 512) traveling slower than the back end (behind the bend in tether 512). The force slowing tether 512 will also accelerate target vehicle 520 until the front end of tether 512 and target vehicle 520 are travelling at the same velocity. If tether 512 has sufficient momentum, target vehicle 520 will reach orbital velocity by the time the bend forming in tether 512 reaches the end of tether 512 at KEST vehicle 510. This is a more direct means of transferring momentum from KEST vehicle 510 to target vehicle 520 and doesn't require a breaking mechanism. The acceleration process occurs over essentially twice the distance and time as compared with embodiments using the approach of FIGS. 2 and 3. This will cut the g-forces on target vehicle 520 and tether 512 in half.

In some embodiments, careful control is required to position the target vehicle within the correct capture zone relative to the KEST vehicle. Both the KEST vehicle and target vehicle may have active electronic controls that use GPS, radar, or other sensors to determine the relative position and trajectory of the vehicles, and a guidance system (with specialized processors and software) to adjust the trajectory using the attitude control system. If both the target vehicle and KEST vehicle use an active guidance control system, then a communication link between the vehicles may be established and used to coordinate their maneuvers.

Figure 6:
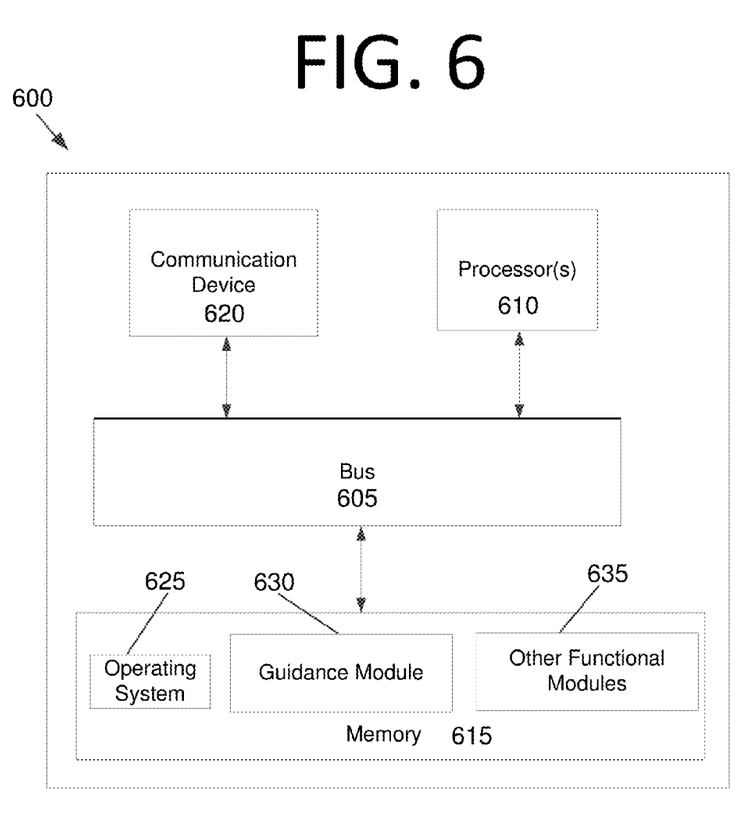
FIG. 6 is a block diagram of a computing system configured to control position, trajectory, and speed of a KEST vehicle or target vehicle, according to an embodiment of the present invention.

FIG. 6 is a block diagram 600 of a computing system (hereinafter "system") configured to control position, trajectory, and speed of a KEST vehicle or target vehicle, according to an embodiment of the present invention. System 600 includes a bus 605 or other communication mechanism for communicating information, and processor(s) 610 coupled to bus 605 for processing information. Processor(s) 610 may be any type of general or specific purpose processor, including a central processing unit (CPU) or application specific integrated circuit (ASIC). System 600 further includes a memory 615 for storing information and instructions to be executed by processor(s) 610. Memory 615 can be comprised of any combination of random access memory ("RAM"), read only memory ("ROM"), flash memory, cache, static storage such as a magnetic or optical disk, or any other types of non-transitory computer-readable media or combinations thereof. Additionally, system 600 includes a communication device 620, such as a transceiver, to wirelessly communicate with external systems.

Non-transitory computer-readable media may be any available media that can be accessed by processor(s) 610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 615 stores software modules that provide functionality when executed by processor(s) 610. The modules include an operating system 625 for system 600. The modules further include a guidance module 630 that is configured to control position, trajectory, and speed of a KEST vehicle or target vehicle. For instance, guidance module 630 may be configured to perform any of the positioning operations discussed herein for its respective vehicle. System 600 may include one or more additional functional modules 635 that include additional functionality.

One skilled in the art will appreciate that a "system" could be embodied as a computer, a server, a console, or any other suitable computing device, or combination of devices. However, in many embodiments, system 600 will be implemented as electronics and software of a vehicle control system. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
catching a target vehicle via a catching mechanism of a Kinetic Energy Storage and Transfer (KEST) vehicle; and
accelerating the target vehicle to a higher energy orbit by applying a braking force, via a braking mechanism of the catching mechanism, to a tether of the KEST vehicle as the catching mechanism and braking mechanism travel along the tether in a direction away from a body of the KEST vehicle.

2. The method of claim 1, wherein the catching mechanism comprises a net, a ring, or a hook.

3. The method of claim 1, further comprising:
determining relative trajectories of the KEST vehicle and the target vehicle, by the KEST vehicle and the target vehicle, via respective active electronic controls that use GPS or radar.

4. The method of claim 1, further comprising:
adjusting respective trajectories, by the KEST vehicle and the target vehicle, using respective active guidance systems.

5. The method of claim 4, further comprising:
establishing a communication link, by the KEST vehicle and the target vehicle, between the KEST vehicle and the target vehicle; and
using the communications link, by the KEST vehicle and the target vehicle, to coordinate vehicle maneuvers of the KEST vehicle, the target vehicles, or both.

6. The method of claim 1, further comprising:
launching the KEST vehicle, via a first launch vehicle, into an elliptical orbit.

7. The method of claim 1, further comprising:
launching the target vehicle, via a second launch vehicle, into a sub-orbital trajectory selected to encounter the KEST vehicle.

8. The method of claim 1, further comprising:
releasing the target vehicle, by the catching mechanism, after the target vehicle has reached a desired velocity.

9. A method, comprising:
catching a target vehicle via a catching mechanism of an orbiting Kinetic Energy Storage and Transfer (KEST) vehicle, wherein the catching mechanism is proximate to a body of the KEST vehicle;
accelerating the target vehicle and slowing the KEST vehicle by applying a braking force, via a braking mechanism of the catching mechanism, as the catching mechanism and the target vehicle travel along a tether in a direction away from the body of the KEST vehicles, thereby increasing momentum of the target vehicle;
releasing the target vehicle; and
returning the catching mechanism to a position proximate to the body of the KEST vehicle.

10. The method of claim 9, wherein the catching mechanism comprises a net.

11. The method of claim 9, further comprising:
determining relative trajectories of the KEST vehicle and the target vehicle, by the KEST vehicle and the target vehicle, via respective active electronic controls that use GPS or radar.

12. The method of claim 9, further comprising:
adjusting respective trajectories, by the KEST vehicle and the target vehicle, using respective active guidance systems.

13. The method of claim 12, further comprising:
establishing a communication link, by the KEST vehicle and the target vehicle, between the KEST vehicle and the target vehicle; and
using the communications link, by the KEST vehicle and the target vehicle, to coordinate respective vehicle maneuvers of the KEST vehicle, the target vehicle, or both.

14. The method of claim 9, further comprising:
releasing the target vehicle, by the catching mechanism, after the target vehicle has reached a desired velocity.

* * * * *